United States Patent Office 3,089,885  
Patented May 14, 1963

3,089,885  
PROCESS FOR THE SELECTIVE RECOVERY OF URANIUM DIRECTLY FROM URANIUM-BEARING ORES  
Jurgen M. Kruse, Pitman, N.J., assignor to E. I. du Pont de Nemours and Company, Wilmington, Del., a corporation of Delaware  
No Drawing. Filed June 23, 1959, Ser. No. 822,175  
4 Claims. (Cl. 260—429.1)

This invention relates to a process for recovering uranium from uranium-containing ores. More particularly, this invention relates to the selective recovery of uranium values from unreduced and unroasted ores containing low concentrations of uranium along with other metals, such as iron, copper, nickel, etc. or compounds thereof commonly found in low-grade uranium ores.

In the recovery of valuable metals from ores which contain low concentrations of these metals, difficulties are encountered which sometimes prohibit the use of the commonly known ore beneficiation methods, such as flotation or pyrometallurgy. In these instances, some type of dissolution or leaching of the ore is necessary to recover the valuable metals. The use of the common leaching or partial dissolution techniques has the disadvantage that other components usually are solubilized along with the desired constituent. Thus, the reagent consumption is based on the ore treated rather than on the small amount of metal recovered. A method of direct leaching of uranium from low-grade uranium ore by contacting at controlled pH the ore with a solution of an organic chelating agent in water is known; however, the recovery of uranium is so low as to make this process commercially unfeasible. An economical chemical process is needed which would provide selective leaching of uranium in high recovery from uranium-containing ores, with a minimum amount of treatment necessary for the gangue materials.

Accordingly, it is an object of this invention to provide a simple method of treatment of uranium ores and the like, particularly uranium ores containing other metals and compounds thereof. Another object is a simple process for the high recovery of uranium from uranium-containing ores notwithstanding the presence of other closely related metals. A further object of this invention is to provide an economical process whereby uranium is selectively solubilized from ores containing low concentrations of uranium notwithstanding the presence of other metals. A still further object is to provide a method of treatment of low-grade uranium ores in which the amount of solubilizing agent used is proportional to the amount of uranium to be recovered and not to the total amount of ore.

I have found that the foregoing objects may be achieved by simply contacting at controlled pH the uranium-containing ore with a solution of an organic polydentate ligand in a nonaqueous or aqueous organic solvent.

In accordance with the process of the invention, uranium is obtained in high recovery by contacting at a pH of about 3 to about 9, the uranium-containing ore with a solution of an organic polydentate ligand in a nonaqueous or aqueous organic solvent for a period of time sufficient to selectively solubilize the uranium values.

The following examples illustrate specific embodiments of the method of carrying out the process of the invention. However, they should not be construed as limiting the invention in any manner.

Example 1

A 30-gram sample of a silicate uranium ore (approximately —20 mesh) containing the following components in the given concentration:

| | | |
|---|---|---|
| $UO_2$ | percent | 0.21 |
| V | do | 0.05 |
| Fe | percent | 0.6–3 |
| Mg | do | 0.06–0.3 |
| Mn | do | 0.1–0.5 |
| $SiO_2$ | do | >25 |
| Na | do | 2–10 |
| Al | do | 2–10 |
| Ca | do | 1–5 |
| Cu | do | 0.06–0.3 |
| Zn | do | 0.6–3 |
| Cr | do | 0.1–0.5 |
| Ti | do | 0.05–0.25 |
| Ag | p.p.m | <300 |
| Ni | percent | 0.1–0.5 | was leached for 16 hours at room temperature with 2 grams of an uncrosslinked salicylic acid-formaldehyde polymer having an average molecular weight of 1350 and 2 grams of salicylic acid in 50 milliliters of acetone at a pH of approximately 5. The acetone leach solution contained 91.5% (58 milligrams) of the uranium present in the ore sample but contained no measurable $VO^{++}$ and <50 micrograms of iron.

Example 2

A 25-gram sample of a silicate uranium ore (as described in Example 1) was ground in 100 milliliters of acetone containing 2 grams of an uncrosslinked salicylic acid-formaldehyde polymer having an average molecular weight of 1350 and 2 grams of salicylic acid. The ore was leached for 16 hours at room temperature and a pH of 5.0. The acetone filtrate from the leaching step contained 90% (47.2 milligrams) of the uranium present in the ore but contained no detectable $VO^{++}$, $Fe^{++}$ and $Fe^{+++}$ ions.

Example 3

A 25-gram sample of a silicate uranium ore (containing the components described in Example 1, but ground to 80% —20 mesh) was slurried with 2 grams of salicylic acid in 100 milliliters of acetone at pH 4.5 for 60 hours at room temperature. The leach solution contained 82% (43 milligrams) of the uranium present in the ore and was free of $VO^{++}$, $Fe^{++}$, and $Fe^{+++}$ ions.

Example 4

A 25-gram sample of a silicate uranium ore (containing the components as described in Example 1, but ground to —60 mesh) was leached with 2 grams of a Schiff base prepared from salicylaldehyde and 1,1-bis(1-aminocyclohexylmethyl)amine in 100 milliliters of a 4/1 acetone/water mixture. The ore was leached at a pH of 8.8 for 8 hours at room temperature. The leach solution contained 84% of the uranium present in the ore and was free of iron (vanadium was not determined).

Example 5

A 25-gram sample of a silicate uranium ore (as described in Example 4) was leached with 0.5 gram of the Schiff base (prepared from salicylaldehyde and 1,1-bis(aminocyclohexylmethyl)-amine) in 100 milliliters of acetone at pH 4.4 for 16 hours. The leach solution contained 94% of the uranium present in the ore and was free of iron (vanadium was not determined).

Example 6

A 25-gram sample of a high-lime uranium ore (0.40% $U_3O_8$, 0.34% vanadium, and 34% calcium carbonate, ground to —100 mesh) was slurried with 0.5 gram of 5,5'-methylenedisalicylic acid and 0.1 gram of potassium permanganate in 100 milliliters of methanol. The ore was leached at pH 4.5 at 60° C. for 2 hours and at room temperature for 3 hours. The filtrate from the slurry contained 71% of the uranium present in the ore and was free of iron and vanadium.

Example 7

A 15-gram sample of another high-lime uranium ore (0.63% $U_3O_8$) was ground to −100 mesh and leached overnight with 4 grams of salicylic acid in 100 milliliters of acetone at pH 3.1. The filtrate from this slurry contained 64% of the uranium.

As the foregoing examples illustrate, high recoveries of uranium may be achieved from ores containing low concentrations of uranium by treatment of the ore with a solution of a chelating agent in a nonaqueous or aqueous organic solvent which solubilizes the uranium but not the other metals present in the ore in the pH range indicated.

Generally, the solubilizing or chelating agents suitable in the process of the invention are organic polydentate ligands which complex uranium at pH 3–9 but will not complex iron at this pH. Suitable polydentate ligands are salicylic acid, salicylaldehyde, salicylamide, uncrosslinked salicylic acid-formaldehyde polymers, 5,5′-methylenedisalicylic acid and mixtures thereof, and Schiff bases prepared from salicylaldehyde and polyamines, for example, ethylenediamine, bis(1-aminocycloalkylmethyl)-amines, N,N′-bis[(1-aminocycloalkyl)methyl]alkylene diamines, N,N′-bis[(1-aminocycloalkyl)methyl]piperazines, N,N′-bis[(2-amino-2-methyl)propyl]piperazine and N,N′-bis[(1-aminocycloalkyl)methyl] - 2 - methylpiperazines. These polydentate ligands may have substituents which would not interfere in the complexation of the uranium.

The aforementioned polyamines containing two primary amino groups and one or more secondary or tertiary amino groups may be prepared by the reduction of the product of the reaction of formaldehyde, a secondary nitro alkane or a nitro cycloalkane, and ammonia, an alkylene diamine, or a piperazine. The preparation and the physical properties of these amines are described in U.S. Patents 2,816,925, 2,816,926, 2,816,927, and 2,816,928, and in co-pending application Serial Number 685,413, filed September 23, 1957, now Patent No. 2,887,488, which is a continuation-in-part of application Serial Numbers 539,261 and 539,262, both filed October 7, 1955 (now abandoned), all assigned to the present assignee.

The amount of chelating agent or mixtures of chelating agents needed to solubilize the uranium from the ore is dependent on the type of ore and the concentration of uranium.

Critical in the process of the invention is the use of a nonaqueous or aqueous organic solvent which dissolves both the solubilizing or chelating agent and complex. The use of a nonaqueous organic solvent is preferred, however. If an aqueous organic solvent is employed, the content of water must be no greater than approximately 25% by weight. Organic solvents suitable in the process of the invention are the ordinary-type solvents, such as the lower alkanols, for example, methanol, ethanol, isopropanol; ketones, for example, acetone or methyl isobutyl ketone. chlorinated hydrocarbons, for example, chloroform; and liquid petroleum fractions, i.e., $C_5$–$C_{15}$ hydrocarbons, for example, kerosene. Because of low cost and availability, acetone or methanol may be the preferred organic solvent.

Because the organic solvent must dissolve both the chelating agent and complex, the amount of solvent employed in the invention is, of course, dependent on the amount of chelating agent, which in turn is dependent on the amount of uranium contained in the ore. There is no upper limitation to the amount of solvent which may be used except that an excessive amount is economically disadvantageous.

The process of the invention can be effected at a pH in the range of about 3 to about 9, and this is a critical feature of the invention. Below a pH of 3, other ions will be solubilized along with uranium, and above pH 9, uranium recovery decreases. The preferred pH range is from about 3.5 to about 5.5. The temperature at which the process is carried out is not critical. The higher the temperature of leaching, the shorter will be the leaching periods. For economical purposes, room temperature may be preferred.

The present invention has been described in detail in the foregoing. However, it will be apparent that many variations may be introduced without departure from the scope of the invention. I intend, therefore, to be limited only by the following claims.

I claim:

1. A process for the selective recovery of uranium from uranium-containing ores which consists essentially of contacting the ore directly at a pH of about from 3 to 9 with a solution consisting essentially of (a) at least one organic polydentate chelating agent selected from the group consisting of salicylic acid, salicylaldehyde, salicylamide, 5,5′-methylenedisalicylic acid, uncrosslinked salicylic acid-formaldehyde polymers, and Schiff bases prepared from salicylaldehyde and polyamines, and (b) inert organic solvent for said chelating agent.

2. A process as claimed in claim 5, wherein the said organic solvent is acetone.

3. A process as claimed in claim 5, wherein the said organic solvent is methanol.

4. A process as claimed in claim 5, wherein the said pH is between about 3.5 and about 5.5.

References Cited in the file of this patent

UNITED STATES PATENTS

| | | |
|---|---|---|
| 2,869,980 | Grinstead | Jan. 20, 1959 |
| 2,896,930 | Menke | July 28, 1959 |
| 2,901,496 | Cowan | Aug. 25, 1959 |

OTHER REFERENCES

Rodden: "Anal. Chem. of the Manhattan Project," vol. VIII–1, pages 33, 120–22 (1950), McGraw-Hill Book Co., Inc., New York.

AEC Document BMI–265, pages 7–23, April 15, 1953, declassified November 25, 1955.

Bernstrom: "Acta Chem. Scand.," 10, No. 2, 163–73 (1956). Abstracted in Nucl. Sci. Abs. 10, 9241.

Clegg et al.: "Uranium Ore Processing," page 265 (1958). Addison-Wesley Publ. Co., Inc., Reading, Mass.

UNITED STATES PATENT OFFICE
CERTIFICATE OF CORRECTION

Patent No. 3,089,885 May 14, 1963

Jurgen M. Kruse

It is hereby certified that error appears in the above numbered patent requiring correction and that the said Letters Patent should read as corrected below.

Column 4, lines 35, 37, and 39, for the claim reference numeral "5", each occurrence, read -- 1 --.

Signed and sealed this 26th day of November 1963.

(SEAL)
Attest:
ERNEST W. SWIDER

Attesting Officer

EDWIN L. REYNOLDS

Acting Commissioner of Patents